United States Patent
Weller et al.

(10) Patent No.: US 11,126,903 B2
(45) Date of Patent: Sep. 21, 2021

(54) METHOD AND SYSTEM FOR CONFIGURABLE AND SCALABLE UNMANNED AERIAL VEHICLES AND SYSTEMS

(71) Applicant: LIMITLESS COMPUTING, INC., Superior, CO (US)

(72) Inventors: Errin T. Weller, Superior, CO (US); Jeffrey B. Franklin, Superior, CO (US)

(73) Assignee: LIMITLESS COMPUTING, INC., Superior, CO (US)

( * ) Notice: Subject to any disclaimer, the term of this patent is extended or adjusted under 35 U.S.C. 154(b) by 353 days.

(21) Appl. No.: 16/144,694

(22) Filed: Sep. 27, 2018

(65) Prior Publication Data
US 2019/0034776 A1    Jan. 31, 2019

Related U.S. Application Data

(62) Division of application No. 15/206,645, filed on Jul. 11, 2016, now Pat. No. 10,115,048.
(Continued)

(51) Int. Cl.
*G06K 19/07* (2006.01)
*B64C 39/02* (2006.01)
(Continued)

(52) U.S. Cl.
CPC ........ *G06K 19/0723* (2013.01); *B64C 39/024* (2013.01); *B64F 5/10* (2017.01);
(Continued)

(58) Field of Classification Search
CPC ...... B64F 5/60; B64F 5/10; B64F 1/02; B64F 1/007; B64F 5/50; B64F 5/40; B64F 1/00;
(Continued)

(56) References Cited

U.S. PATENT DOCUMENTS

| | | | |
|---|---|---|---|
| 4,757,463 A | * | 7/1988 | Ballou ................... F02P 17/00 701/114 |
| 5,571,953 A | | 11/1996 | Wu |

(Continued)

FOREIGN PATENT DOCUMENTS

| | | |
|---|---|---|
| CN | 102114914 A | 7/2011 |
| CN | 102566420 A | 7/2012 |

(Continued)

*Primary Examiner* — Luis A Martinez Borrero
(74) *Attorney, Agent, or Firm* — Snell & Wilmer L.L.P.; Kent A. Lembke (57) ABSTRACT

An unmanned aircraft system (UAS) making use of unmanned aerial vehicles (UAVs) for more than one task. The inventors discovered that an improved UAS could be provided by combining one or more of these three elements: (1) hot-swappable modular kits (e.g., a plurality of components useful in UAVs to perform particular user-selectable tasks); (2) an interconnection mechanism for each component with identification protocols that provides both a physical and a data connection; and (3) an intelligent system that interprets the identification protocols and determines the configuration for a selected task, error checking, airworthiness, and calibration. The system and associated methods for the task based drone configuration and verification reduces the possibility of task failure by an operator.

16 Claims, 9 Drawing Sheets

Related U.S. Application Data (60) Provisional application No. 62/194,970, filed on Jul. 21, 2015.

(51) Int. Cl.
| | |
|---|---|
| *G06F 11/00* | (2006.01) |
| *G06Q 10/00* | (2012.01) |
| *G06Q 50/30* | (2012.01) |
| *G08G 5/00* | (2006.01) |
| *G06Q 10/06* | (2012.01) |
| *B64F 5/10* | (2017.01) |
| *B64F 5/60* | (2017.01) |
| *G06F 3/00* | (2006.01) |
| *G06F 3/0482* | (2013.01) |

(52) U.S. Cl.
CPC .............. *B64F 5/60* (2017.01); *G06F 3/00* (2013.01); *G06F 11/00* (2013.01); *G06Q 10/00* (2013.01); *G06Q 10/06* (2013.01); *G06Q 10/20* (2013.01); *G06Q 50/30* (2013.01); *G08G 5/0013* (2013.01); *G08G 5/0026* (2013.01); *G08G 5/0069* (2013.01); *B64C 2201/125* (2013.01); *B64C 2201/126* (2013.01); *B64C 2201/127* (2013.01); *B64C 2201/146* (2013.01); *G06F 3/0482* (2013.01)

(58) Field of Classification Search
CPC ..... B64C 39/024; B64C 2211/00; B64C 3/56; B64C 1/061; B64C 25/10; B64C 39/10; B64C 2201/146; B64C 2201/141; B64C 39/022; G01C 23/00; G01C 23/005; G01C 19/00; G01C 21/206; G06K 19/0723; G06K 9/00664; G06K 9/0063; G06F 3/00; G06F 11/2033; G06F 13/4252; G06Q 10/20; G06Q 30/02; G06Q 30/06; G08G 1/0104; G08G 1/0116; G08G 1/017
See application file for complete search history.

(56) References Cited

U.S. PATENT DOCUMENTS

| | | | |
|---|---|---|---|
| 5,581,250 A | 12/1996 | Khvilivitzky | |
| 5,901,272 A | 5/1999 | Schaefer, Jr. et al. | |
| 5,904,724 A | 5/1999 | Margolin | |
| 6,023,061 A | 2/2000 | Bodkin | |
| 6,085,127 A | 7/2000 | Vos | |
| 6,114,970 A | 9/2000 | Kirson et al. | |
| 6,122,572 A | 9/2000 | Yavnai | |
| 6,140,958 A | 10/2000 | Johnson et al. | |
| 6,208,936 B1 | 3/2001 | Minor et al. | |
| 6,260,796 B1 | 7/2001 | Klingensmith | |
| 6,460,810 B2 | 10/2002 | James | |
| 6,473,824 B1 | 10/2002 | Kreissig et al. | |
| 6,497,600 B1 | 12/2002 | Levy et al. | |
| 6,539,290 B1 | 3/2003 | Vos | |
| 6,577,976 B1 | 6/2003 | Hoff et al. | |
| 6,584,382 B2 | 6/2003 | Karem | |
| 6,665,594 B1 | 12/2003 | Armstrong | |
| 6,694,228 B2 | 2/2004 | Rios | |
| 6,710,567 B2 | 3/2004 | Heydt et al. | |
| 6,711,477 B1 | 3/2004 | Johnson et al. | |
| 6,801,769 B1 | 10/2004 | Royalty | |
| 6,840,480 B2 | 1/2005 | Carroll | |
| 6,847,856 B1 | 1/2005 | Bohannon | |
| 6,847,865 B2 | 1/2005 | Carroll | |
| 6,856,894 B1 | 2/2005 | Bodin et al. | |
| 6,859,729 B2 | 2/2005 | Breakfield et al. | |
| 6,873,886 B1 | 3/2005 | Mullen et al. | |
| 6,925,382 B2 | 8/2005 | Lahn | |
| 6,948,681 B2 | 9/2005 | Stupakis | |
| 7,093,294 B2 | 8/2006 | Lingafelt et al. | |
| 7,130,741 B2 | 10/2006 | Bodin et al. | |
| 7,228,232 B2 | 6/2007 | Bodin et al. | |
| 7,231,294 B2 | 6/2007 | Bodin et al. | |
| 7,252,453 B1 | 8/2007 | Little | |
| 7,262,730 B2 | 8/2007 | Larsson et al. | |
| 7,269,513 B2 | 9/2007 | Herwitz | |
| 7,315,548 B2 | 1/2008 | Joshi | |
| 7,331,019 B2 | 2/2008 | Ananth et al. | |
| 7,346,188 B2 | 3/2008 | Aichi | |
| 7,370,078 B1 | 5/2008 | Woodruff | |
| 7,431,243 B1 | 10/2008 | Allen | |
| 7,474,212 B2 | 1/2009 | Nakagawa et al. | |
| 7,477,993 B2 | 1/2009 | Sunshine et al. | |
| 7,496,670 B1 | 2/2009 | Givoly | |
| 7,502,684 B2 | 3/2009 | Haas | |
| 7,577,870 B2 | 8/2009 | Combs | |
| 7,581,702 B2 | 9/2009 | Olson et al. | |
| 7,592,945 B2 | 9/2009 | Colburn et al. | |
| 7,598,888 B2 | 10/2009 | Matuska et al. | |
| 7,617,024 B2 | 11/2009 | Builta | |
| 7,641,461 B2 | 1/2010 | Khoshnevis | |
| 7,647,232 B2 | 1/2010 | Moitra et al. | |
| 7,669,805 B2 | 3/2010 | Hors et al. | |
| 7,680,691 B2 | 3/2010 | Kimball et al. | |
| 7,737,878 B2 | 6/2010 | Van Tooren et al. | |
| 7,765,038 B2 | 7/2010 | Appleby et al. | |
| 7,778,744 B2 | 8/2010 | Rath et al. | |
| 7,806,371 B2 | 10/2010 | Troutman | |
| 7,865,277 B1 | 1/2011 | Larson et al. | |
| 7,931,238 B2 | 4/2011 | Builta et al. | |
| 7,962,252 B2 | 6/2011 | Shams et al. | |
| 7,962,254 B2 | 6/2011 | Bouchet et al. | |
| 7,970,539 B2 | 6/2011 | Lee | |
| 8,024,138 B2 | 9/2011 | Carroll et al. | |
| 8,074,941 B2 | 12/2011 | Daunois et al. | |
| 8,078,395 B2 | 12/2011 | Builta et al. | |
| 8,106,746 B2 | 1/2012 | Maltseff et al. | |
| 8,141,814 B2 | 3/2012 | Kulesha | |
| 8,155,805 B2 | 4/2012 | Van Der Spek | |
| 8,167,236 B2 | 5/2012 | Jess | |
| 8,186,589 B2 | 5/2012 | Asher et al. | |
| 8,355,834 B2 | 1/2013 | Duggan et al. | |
| 8,457,809 B2 | 6/2013 | Lee | |
| 8,473,125 B2 | 6/2013 | Rischmuller et al. | |
| 8,474,761 B2 | 7/2013 | Callou | |
| 8,498,447 B2 | 7/2013 | Derbanne | |
| 8,515,609 B2 | 8/2013 | McAndrew et al. | |
| 8,543,265 B2 | 9/2013 | Ekhaguere et al. | |
| 8,600,602 B1 | 12/2013 | McAndrew et al. | |
| 8,662,438 B2 | 3/2014 | Savoye et al. | |
| 8,838,289 B2 | 9/2014 | Margolin | |
| 8,989,924 B2 | 3/2015 | Parrot | |
| 9,004,396 B1 | 4/2015 | Colin et al. | |
| 9,004,973 B2 | 4/2015 | Condon et al. | |
| 9,011,250 B2 | 4/2015 | Condon et al. | |
| 9,044,543 B2 | 6/2015 | Levien et al. | |
| 9,061,102 B2 | 6/2015 | Levien et al. | |
| 9,085,362 B1 * | 7/2015 | Kilian | B64F 1/02 |
| 9,146,557 B1 | 9/2015 | Ahmed et al. | |
| 9,195,233 B2 | 11/2015 | Perrone | |
| 9,273,981 B1 * | 3/2016 | Downey | B64D 47/08 |
| 9,310,221 B1 * | 4/2016 | Downey | B64C 39/024 |
| 9,376,208 B1 * | 6/2016 | Gentry | G08G 5/006 |
| 9,658,271 B2 * | 5/2017 | Thomas | G01R 31/086 |
| 9,676,472 B2 | 6/2017 | Hayes et al. | |
| 9,740,200 B2 * | 8/2017 | Bethke | G08G 5/0013 |
| 9,771,162 B1 * | 9/2017 | Gentry | B64D 27/24 |
| 9,922,282 B2 * | 3/2018 | Weller | B64F 5/10 |
| 10,115,048 B2 * | 10/2018 | Weller | G06Q 50/30 |
| 10,296,862 B1 * | 5/2019 | Oddo | G06Q 10/06395 |
| 10,435,143 B1 * | 10/2019 | O'Brien | B64C 27/08 |
| 10,625,873 B2 * | 4/2020 | Djelassi | F02C 9/00 |
| 10,713,102 B2 * | 7/2020 | Klein | H04L 63/08 |
| 10,741,088 B1 * | 8/2020 | Walker | G08G 5/0021 |
| 10,764,196 B2 * | 9/2020 | Downey | B64D 47/00 |
| 10,800,546 B2 * | 10/2020 | Kilian | B64C 25/68 |
| 2003/0009270 A1 | 1/2003 | Breed | |
| 2005/0004723 A1 | 1/2005 | Duggan et al. | |

(56) References Cited

U.S. PATENT DOCUMENTS

| | | |
|---|---|---|
| 2007/0246610 A1 | 10/2007 | Rath et al. |
| 2008/0155306 A1 | 6/2008 | Combs |
| 2008/0294305 A1 | 11/2008 | Roesch |
| 2009/0045296 A1* | 2/2009 | Cerchie .............. B64C 13/341 244/76 R |
| 2010/0004798 A1 | 1/2010 | Bodin et al. |
| 2010/0063754 A1* | 3/2010 | Thomas ............... G01R 31/086 702/59 |
| 2010/0084513 A1 | 4/2010 | Gariepy et al. |
| 2010/0250022 A1 | 9/2010 | Hines et al. |
| 2010/0286847 A1* | 11/2010 | Cerchie .............. B64C 13/343 701/2 |
| 2011/0043219 A1* | 2/2011 | Ganesh ............ G01R 31/1272 324/543 |
| 2011/0046821 A1* | 2/2011 | Grabowsky .......... B64C 39/00 701/3 |
| 2011/0049290 A1 | 3/2011 | Seydoux et al. |
| 2011/0084162 A1 | 4/2011 | Goossen et al. |
| 2011/0221692 A1 | 9/2011 | Seydoux et al. |
| 2011/0320068 A1 | 12/2011 | Lee et al. |
| 2012/0035787 A1* | 2/2012 | Dunkelberger ....... B64C 39/024 701/3 |
| 2012/0215382 A1 | 8/2012 | Lee et al. |
| 2012/0292435 A1* | 11/2012 | Karem .................. B64C 1/00 244/36 |
| 2013/0325217 A1 | 12/2013 | Parrot |
| 2014/0024999 A1* | 1/2014 | Levien ................. G16H 40/67 604/66 |
| 2014/0025229 A1* | 1/2014 | Levien ................. G05D 1/0202 701/2 |
| 2014/0025233 A1* | 1/2014 | Levien ................. G16H 40/67 701/3 |
| 2014/0025234 A1* | 1/2014 | Levien ................. G16H 40/67 701/3 |
| 2014/0025235 A1* | 1/2014 | Levien ................. G06Q 10/08 701/3 |
| 2014/0025236 A1* | 1/2014 | Levien ................. G06F 7/76 701/3 |
| 2014/0061377 A1 | 3/2014 | Smith |
| 2014/0191079 A1 | 7/2014 | Ehinger et al. |
| 2014/0229004 A1 | 8/2014 | Dooley et al. |
| 2014/0231593 A1* | 8/2014 | Karem .................. B64C 1/00 244/45 R |
| 2014/0244078 A1* | 8/2014 | Downey ............... G06F 21/44 701/11 |
| 2014/0277834 A1 | 9/2014 | Levien et al. |
| 2015/0051755 A1 | 2/2015 | Erhart et al. |
| 2015/0323930 A1* | 11/2015 | Downey ............... G08G 5/006 701/2 |
| 2016/0070260 A1* | 3/2016 | Levien ................. G16H 40/67 701/3 |
| 2016/0378108 A1* | 12/2016 | Paczan ................. B64C 39/024 705/330 |
| 2017/0021925 A1* | 1/2017 | Weller ................. G06F 11/00 |
| 2017/0021946 A1* | 1/2017 | Weller ................. G06F 11/00 |
| 2017/0153283 A1* | 6/2017 | Gontier ............... G01R 31/58 |
| 2017/0305535 A1* | 10/2017 | Hayes ................. B64C 39/00 |
| 2018/0244401 A1* | 8/2018 | Kilian ................. B64F 1/027 |
| 2020/0180760 A1* | 6/2020 | Richardson ............. B64C 3/26 |

FOREIGN PATENT DOCUMENTS

| | | |
|---|---|---|
| CN | 103217983 A | 7/2013 |
| CN | 102114914 B | 3/2014 |
| CN | 102566420 B | 8/2014 |
| CN | 104097773 A | 10/2014 |
| CN | 102849226 B | 10/2015 |
| DE | 102008014853 A1 | 10/2009 |
| DE | 102008014853 B4 | 11/2010 |
| DE | 102006013402 B4 | 4/2011 |
| DE | 102013000409 A1 | 7/2014 |
| EP | 1898181 A1 | 3/2008 |
| EP | 1926007 A2 | 5/2008 |
| EP | 2177966 A2 | 4/2010 |
| EP | 2818835 A3 | 3/2015 |
| WO | 2012085305 A1 | 6/2012 |
| WO | 2014029431 A1 | 2/2014 |
| WO | 2015021159 A1 | 2/2015 |
| WO | 2015073687 A1 | 5/2015 |
| WO | 2015085155 A1 | 6/2015 |
| WO | 2015103700 A1 | 7/2015 |
| WO | 2015126447 A1 | 8/2015 |

* cited by examiner

METHOD AND SYSTEM FOR CONFIGURABLE AND SCALABLE UNMANNED AERIAL VEHICLES AND SYSTEMS

CROSS-REFERENCE TO RELATED APPLICATION

This application is a divisional of U.S. patent application Ser. No. 15/206,645, filed Jul. 11, 2016, which claims the benefit of U.S. Provisional Application No. 62/194,970 filed Jul. 21, 2015, both of which are incorporated herein by reference in their entireties.

FIELD OF THE DESCRIPTION

This description relates generally to design of an unmanned aircraft (or aerial) system (UAS) and, specifically, to the customization, configuration, and verification of components with related automatic calibration of a UAS with unmanned aerial vehicles (UAVs) (or unmanned aircraft (UA)) for user-designated purposes.

RELEVANT BACKGROUND

Recently, there has been a rapid expansion in the production and use of unmanned aerial vehicles (UAVs) for personal and commercial use. Further, a single UAV and its controls may be labeled or considered an unmanned aerial system (UAS), and some have labeled the UAS "autonomous systems." One problem with the use and further adoption of UAS is that the UAS (and its UAVs) is typically configured and designed for a single use or for a very specific purpose. Also, with such specialization, a user may require significant training to control and operate the UAS or to attempt to modify its uses (e.g., to repurpose the UAV to perform a different task).

Hence, there remains a need in the quickly expanding UAV (or drone) industry to provide a UAS that supports customization and configuration of its components. For many, it would be preferable if such customization and configuration involved automatic calibration of a UAS with unmanned aerial vehicles (UAVs) for user-designated purposes.

In the past, such as in the design and processes described in U.S. Pat. Appl. Publ. No. 20140061377, the UAS design and associated methods have traditionally focused on components of the UAS (e.g., its UAVs) that were designed for a single purpose. For example, the UAS was adapted for a particular payload lift or for overcoming a weather constraint. Problems encountered with such prior methods make UAS and UAV systems inaccessible to many people because of the need for specific knowledge.

SUMMARY

Briefly, the present description provides a means to rapidly reconfigure a UAS to assume multiple roles without reinvestment or advanced knowledge of software and flight systems. The UAS system and associated method described herein provide a unique combination of modular components capable of being combined into multiple configurations for customized industrial, commercial, or personal applications. The UAS system and method improve the user experience of UAS and UAVs, increase potential applications for unmanned systems, and aid in the adoption of the technology and gathering of data.

One exemplary goal or purpose the inventors had in creating the new UAS system and method was to make the UAS with associated UAVs more versatile. The inventors discovered that an improved UAS could be provided by combining one or more of these three (or more) elements: (1) hot-swappable modular kits (e.g., a plurality of components including: (a) cameras (such as at least one camera (a camera set) such as, but not limited to, a remote sensing thermal, an aerial photography, a video, a visual spectrum, an infrared, or other useful camera), (b) one or more processors (including, but not limited to, a CPU and/or a GPU), (c) wireless communication (e.g., I/O devices in each UAV and the UAS controller), (d) ground control, (e) streaming devices, (f) cloud connections, (g) data processing, (h) flight control, (i) power distribution, (j) motors, (k) UAV frames, (l) fuselage, (m) fins, (n) props, (o) receivers, (p) antennas, (q) sensors (including, but not limited to, gyroscopes, accelerometers, and the like), (r) electronic speed control, (s) power source, (t) remotes, (u) alarms, (v) vibration suppression, and (w) obstacle avoidance systems); (2) an interconnection mechanism for each component (in the hot-swappable modular kit) with identification protocols that provides both a physical and a data connection; and (3) an intelligent system that interprets the identification protocols and performs the associated calibration (including, but not limited to, payload calculations, power distribution, flight control, range and altitude control, data processing, and the like) and verification of correct installation.

More particularly, an unmanned aircraft system (UAS) is provided that includes an unmanned aerial vehicle (UAV). The UAS also includes a processor running a UAS design module (or intelligent UAS method or software). The UAS includes a user input device receiving user input indicating a selected task. The UAS includes a display device operated by the processor to display an identifier for a UAS module determined by the UAS design module for performing the selected task (e.g., the processor, input device, and display device/screen may be included in a ground controller or base station in the UAS). The UAS further includes a connector associated with the UAS module, and the UAS module is communicatively coupled to the UAV via the connector.

In some embodiments, the UAS module includes memory storing module data including an identifier of the connector and a location on the UAV for positioning the connector. In the same or other embodiments, the UAS module includes memory storing module data including one or more of: an identifier of the UAS module, weight of the UAS module, power consumption by the UAS module, sensors included in the UAS module, number and location of connectors for attaching the UAS module to the UAV, lift provided by the UAS module, power provided by the UAS module, and mounting location for the UAS module to the UAV. In the same or other cases, the UAS module includes memory storing module data including identification of the UAS module, and the UAS design module verifies that the UAS module is communicatively coupled to the UAV via the connector via communications with the UAS module via the connector based on the identification in the memory.

In other representative implementations, the UAS design module determines a second UAS module for performing the selected task (e.g., the user-selected task or purpose for the UAS requires that the UAV have two (or more) modules). The second UAS module includes module data in memory, and the module data for the UAS module and the second UAS module further includes a module weight and a module-provided lift. Then, the processor runs an auto-calibration module determining whether the module-provided lift of the UAS module and the second UAS module is greater at least than the weight of the UAS module and the second UAS module and if not to display an error message on the display device.

In other cases, the UAS design module determines a second UAS module for performing the selected task, and the second UAS module includes module data in memory. In these cases, though, the module data for the UAS module and the second UAS module further includes a power consumption value and a power provided value. The processor further runs an autocalibration module to determine whether the summation of the power provided values exceeds a summation of the power consumption values and if not to display an error message on the display device. In some instances, the UAS design module is adapted to determine a range for the UAV with the UAS module based on module data stored in memory of the UAS module, and the processor may operate the display device to display the determined range.

In these or other exemplary implementations, the UAS module comprises one or more components from the group of: a camera, a sensor, a navigation element, a processor, a wireless communication element, memory, persistent memory storing module data, a power source, an UAV fuselage, a payload, a stabilization element, a thrust element, a lift element, a display device, and a flight control device.

Further aspects of the description will become apparent from consideration of the drawings and ensuing description of preferred embodiments of the invention. A person skilled in the art will realize that other embodiments of the invention are possible and that the details of the description can be modified in a number of respects, all without departing from the inventive concept(s). Thus, the following drawings and description are to be regarded as illustrative in nature and not restrictive.

BRIEF DESCRIPTION OF THE DRAWINGS

The features of the description will be better understood by reference to the accompanying drawings which illustrate representative embodiments of the description. In the drawings.

DETAILED DESCRIPTION OF THE PREFERRED EMBODIMENTS

The following description provides a new task-based unmanned aerial system (UAS) that is specially configured with self-calibration and error checking. One advantage of the UAS is that it combines a wide array of hardware with application-specific software (programs or code executed by a processor to perform described functions) to quickly deploy a UAS system for a purpose. In one particular, but not limiting, implementation example, the UAS includes a module or software/programs (and any additional hardware) for three dimensional (3D) scanning, another module for augmented reality (e.g., an AR module), another module for real-time environmental conditioning monitoring, and so forth. Hence, the UAS system is quickly and easily configurable.

Another advantage of the described UAS is that because the application-specific modules are configurable, the UAS is easily scalable and customizable from a small UAS for a single task to a larger or more complex UAS for performing multiple tasks (with tasks changing over time in some cases). This enables minimal initial hardware investment and removes obstacles for UAS adoption. Furthermore, the automatic (or "self") calibration and error checking ensures successful completion of UAS-assisted tasks.

Figure 1:
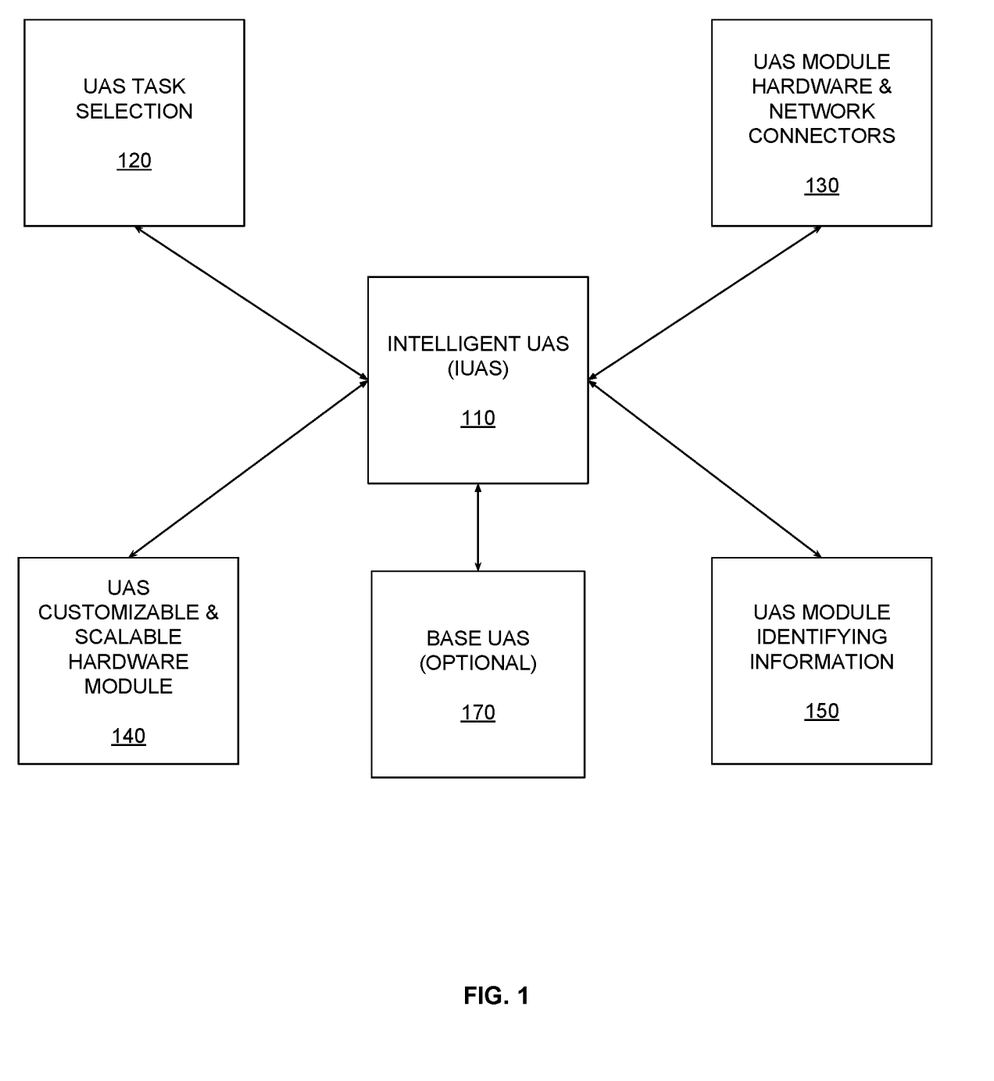
FIG. 1 is a block diagram illustrating one embodiment of an intelligent UAS (IUAS) system of the present description.

Referring now to the figures, one preferred embodiment of the configurable and scalable modular UAS system 110 incorporating task-based design and self-calibration software is shown in FIG. 1. The inventors discovered that UAS parts can be modified or configured to include knowledgeable application-specific software. With this modification or advancement, the IUAS system (or simply the UAS) 110 of the various embodiments yields a quick and accurate technique for delivering desired data and UAS applications without the need for advanced knowledge of flight systems or UAV and UAS components.

Figure 3:
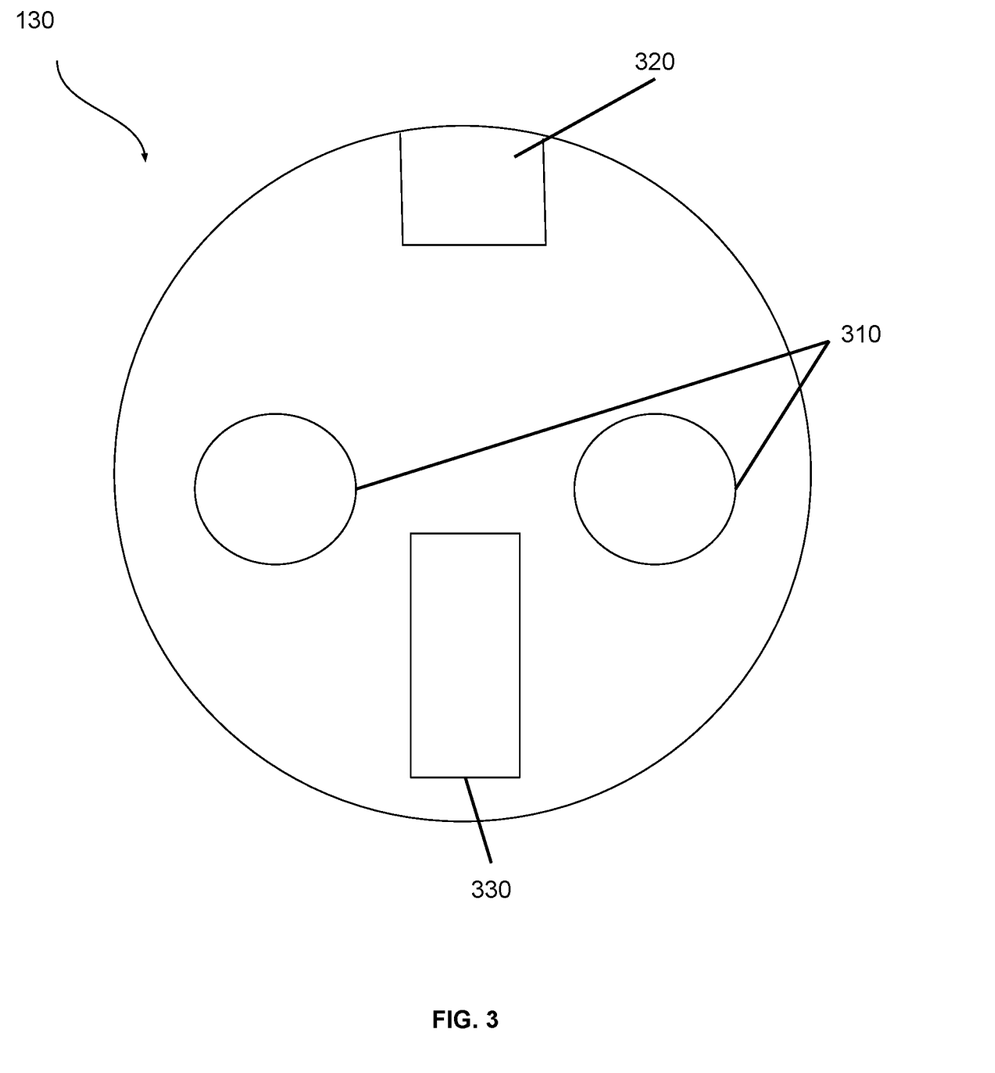
FIG. 3 illustrates one embodiment of physical and data connections for a scalable and customizable hardware module such as the module of FIG. 2.
Figure 4:
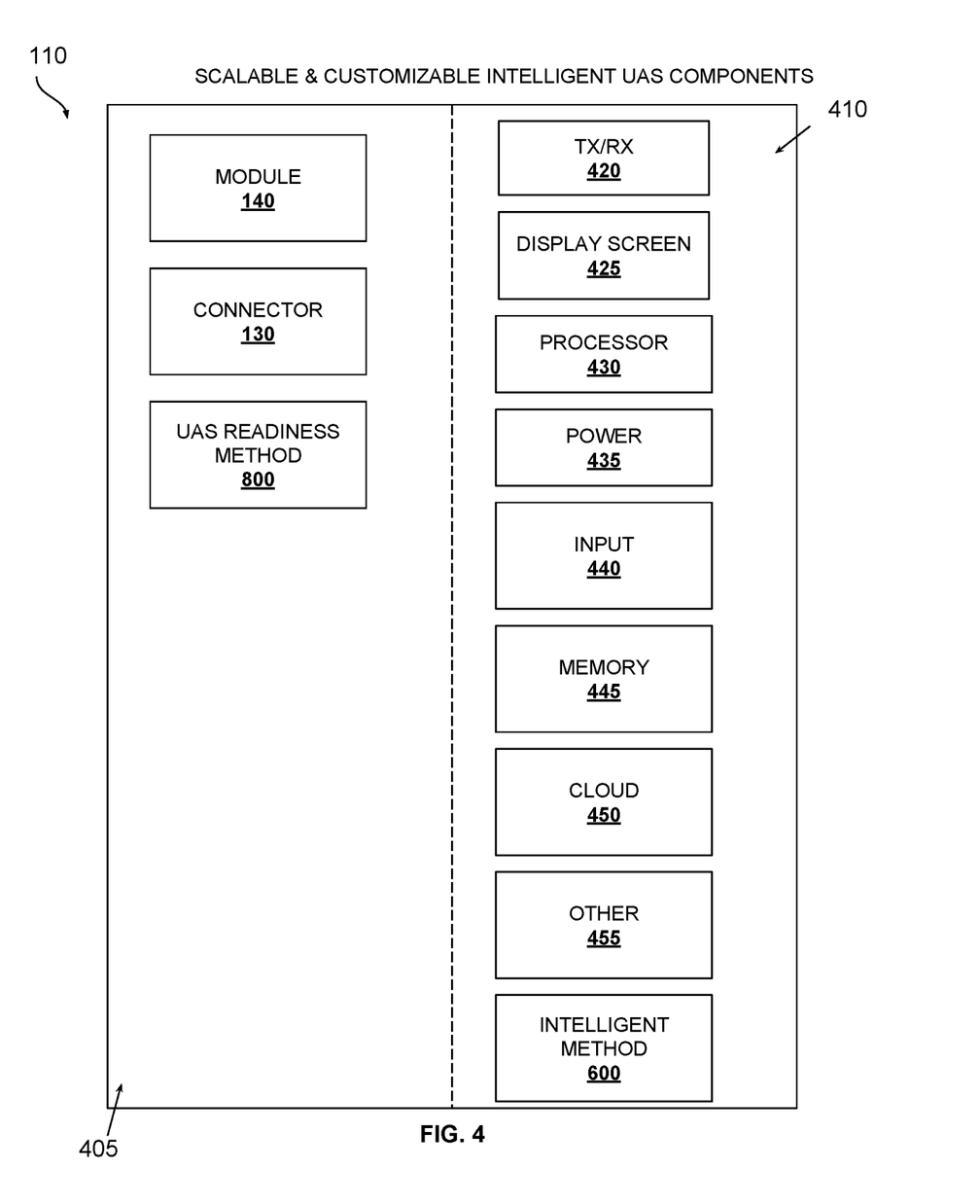
FIG. 4 is a block diagram illustrating one embodiment of the scalable and customizable intelligent UAS components that may be provided in the UAS of FIG. 1.

As shown at 120 (also with reference to FIG. 4) and arrows, the UAS 110 includes memory for storing a UAS task selection (or user input) that may be provided by a user or operator (e.g., from user 180, shown in FIG. 9) via an I/O device of the UAS 110 via I/O devices provided and managed by a controller (e.g., a controller 410 with one or more processors and control software as shown in FIG. 4). The use or processing of this user task selection/user input from user 180 is described in more detail below. The UAS 110 also includes module hardware and/or network connectors 130 for receiving and/or mounting one or more modules (such as modules 140), e.g., for connection of a hardware/software module to a UAV or the like. Such a connector 130 may be implemented as shown with reference to FIG. 3.

Figure 2:
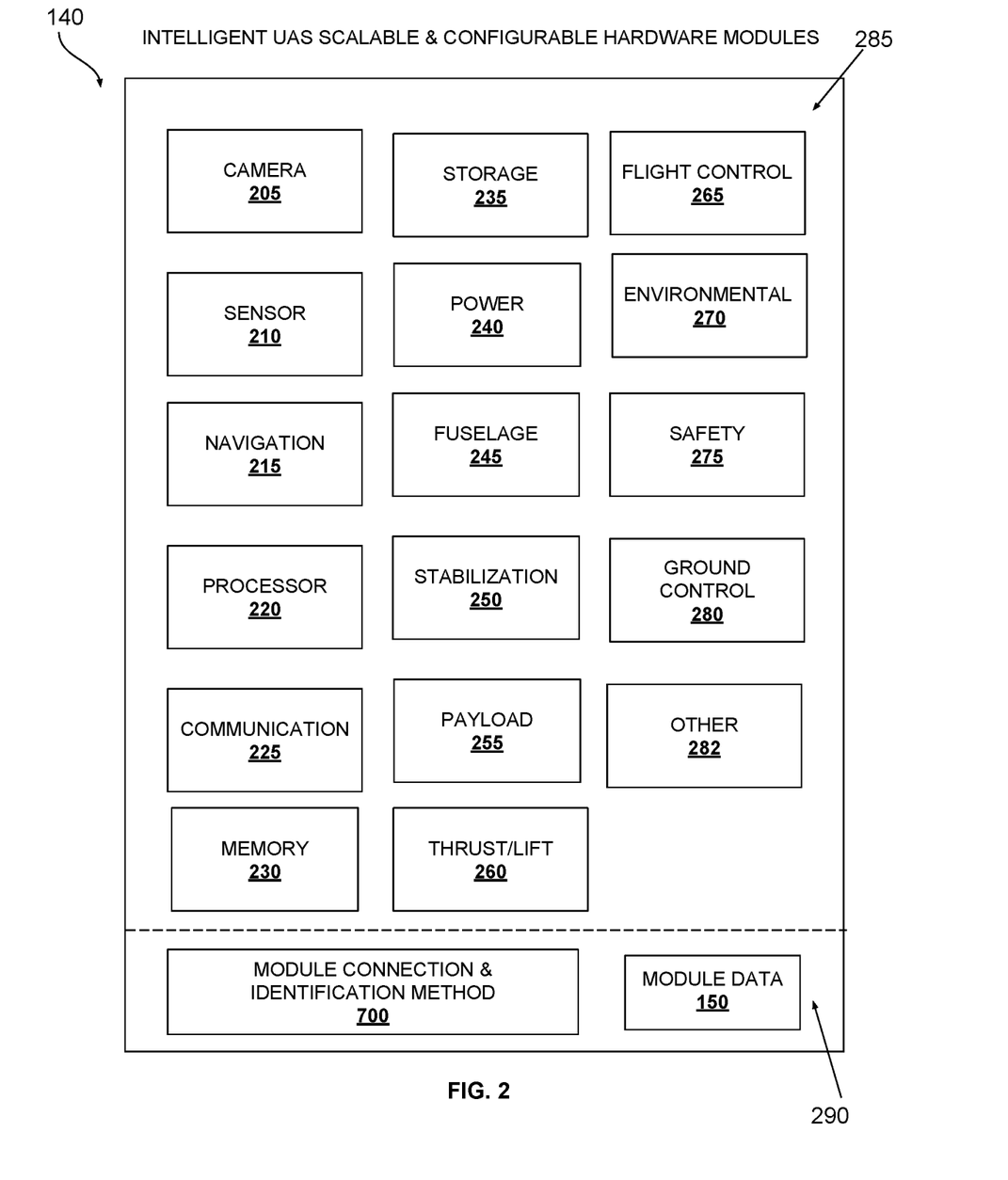
FIG. 2 is a block diagram illustrating one embodiment of the components of a hardware module for the intelligent UAS system of FIG. 1.

Significantly, the UAS 110 also includes one or more customizable and scalable hardware modules 140. These may be implemented as shown in FIG. 2. The module 140 (or modular kit) may include one or more of the following components: (a) cameras (such as at least one camera (a camera set) such as, but not limited to, a remote sensing thermal imager, an aerial photography, a video, a visual spectrum, an infrared, or other useful camera), (b) one or more processors (including, but not limited to, a CPU and/or a GPU), (c) wireless communication (e.g., I/O devices in each UAV and the UAS controller), (d) ground control, (e) streaming devices, (f) cloud connections, (g) data processing, (h) flight control, (i) power distribution, (j) motors, (k)

UAV frames, (l) fuselage, (m) fins, (n) props, (o) receivers, (p) antennas, (q) sensors (including, but not limited to, gyroscopes, accelerometers, and the like), (r) electronic speed control, (s) power source, (t) remotes, (u) alarms, (v) vibration suppression, (w) obstacle avoidance systems, (x) payload; (y) stabilization; and (z) lift. The components of the module 140 are coupled within the UAS (e.g., onto or to form a UAV) using the connectors 130.

Further, the UAS 110 includes module identifying information 150 (or memory/data storage for storing such information 150). This information 150 is processed by a controller or control software of the UAS 110 as described below to provide self or automated calibration of the UAS 110 and error checking during assembly. The module identifying information 150 may include a UAV module identifier (such as ID 515 shown in FIG. 5 as part of the module data 150, which may be included in memory of the hardware module 140 shown in FIG. 2 (or as part of module 140)).

Further, the UAS 110 may include a basic UAS configuration or ground controller 170, which may take the form of ground controller or base station 410 in FIG. 4, to allow a remote operator to provide user input to the UAS 110 and/or to provide some amount of manual control over the UAS 110 (or its UAVs). The base UAS 170 may have preconfigured components, and it is an optional component in some implementations of the UAS 110. The base UAS 170 may also take the form of a common module with components utilized by numerous configurations of a UAS (e.g. thrust, power, fuselage, communication, ground control, and the like).

FIG. 2 details one preferred embodiment of an intelligent UAS scalable and customizable hardware module 140 (or hot-swappable modular kit). The module 140 is comprised of, but not limited to, hardware components 285 and software (or data) components 290. The hardware components 285 are shown to include: a camera(s) 205 (e.g. for remote sensing, optical sensor packages (cameras), infrared (IR) cameras, and electro-optical (EO) cameras, aerial photography (at different resolutions), video, visual spectrum, and infrared imaging); sensors 210 (e.g. multi-use sensors to minimize swapping, motion, ultrasonic, magnetic field, accelerometer, gyroscope, optic flow, laser range finders, acoustic, synthetic vision, thermal imaging, RADAR); navigation 215; a processor(s) 220 (e.g. one or more CPUs, GPUs, FPGAs, specialized processors, or other processors for data processing); communication elements 225; memory 230 (e.g. volatile memory such as RAM); storage 235 (e.g. non-volatile memory such as solid state, flash, optical, magnetic storage (e.g., hard drives), millipede, SD cards, USB, or other available storage); power 240 (e.g. one or more batteries, electrical power, liquids such as gasoline or hydrogen, a renewable energy source such as solar or wind, may be rechargeable, or any other suitable power source); frame 245 (e.g. fuselage, UAV frame(s), fin(s), and prop(s) and their specific appearance such as camouflage); stabilization and vibration suppression elements 250; payload 255 (e.g. dispersants, deliverables, or other payloads); a thrust device(s) 260; flight control components 265 (e.g. electronic speed control); environmental conditions 270 (e.g. pressure, humidity, light, UV, temperature, wind speed, water currents, barometer, calorimeters, heat rate sensors, sun sensors for spaceborne operation, and other environmental sensors); safety 275 (e.g. obstacle avoidance system, proximity sensors, GPS, geofencing); ground control 280 (e.g. devices or components for human control of the vehicle that can range in complexity); and other 282 (e.g. cooling, warning alarms, USB ports). In implementing the module 140, these hardware components 285 can be combined in a plurality of arrangements ranging from utilizing a single one of the components to a modular kit that includes many-to-all components or even redundant components (e.g., there can be multiple cameras 205, multiple sensors 210, multiple processors 220, and so forth, combined or omitted as necessary for selected task).

Figure 5:
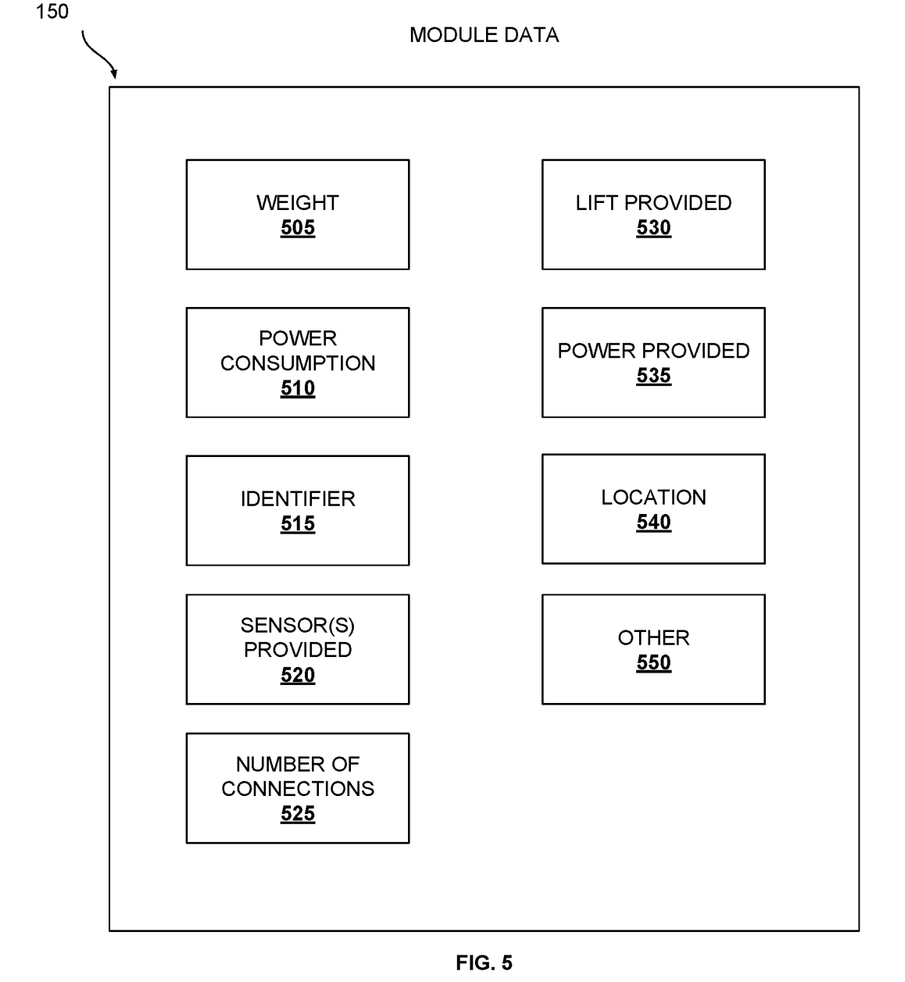
FIG. 5 is a block diagram illustrating one embodiment of the data associated with a customizable module for use in a UAS such as the module of FIG. 2.

The communication component 225 may include, but is not limited to, communication devices implementing cellular, internet, Bluetooth, Ethernet, satellite, Wi-Fi, radio, transponders, and streaming apparatuses. In some embodiments, communication component 225 may include wired technologies that provide a data connection such as fiber optic and it is understood that component 225 may include other wired and wireless technologies. The software components 290 of the module 140 may include module data (or module data communication element) 150, e.g., include software/programming (which may be executed by processor 220) to communicate (e.g., with communication component 225) the module data as shown in FIG. 5 into or within the UAS 110 (e.g., to a controller or control module run by a processor of the UAS 110). The method 700 for identifying and verifying module connections may also be included in software components 290 (method 700 is further detailed in FIG. 7 and may be implemented by code provided as one or more of the components 290).

FIG. 3 illustrates one preferred embodiment of a connector 130 that may be provided on module 140 (e.g., to implement the connector 130 shown in FIG. 1). The connector 130 is configured to provide physical and data connections. As shown, the connector 130 includes guide pins 310 to mount a hardware module (e.g., module 140) and to guide data connection with coupling or data connector 330 into the correct location in the UAS (e.g., UAS 110 of FIG. 1). The connector 130 also includes a locking mechanism 320 that secures connector 130 within a UAS (such as onto a UAV). In some UAS implementations, the data connector or connection 330 employs a peer-to-peer network protocol while other protocols may be used in the same or other cases.

Figure 6:
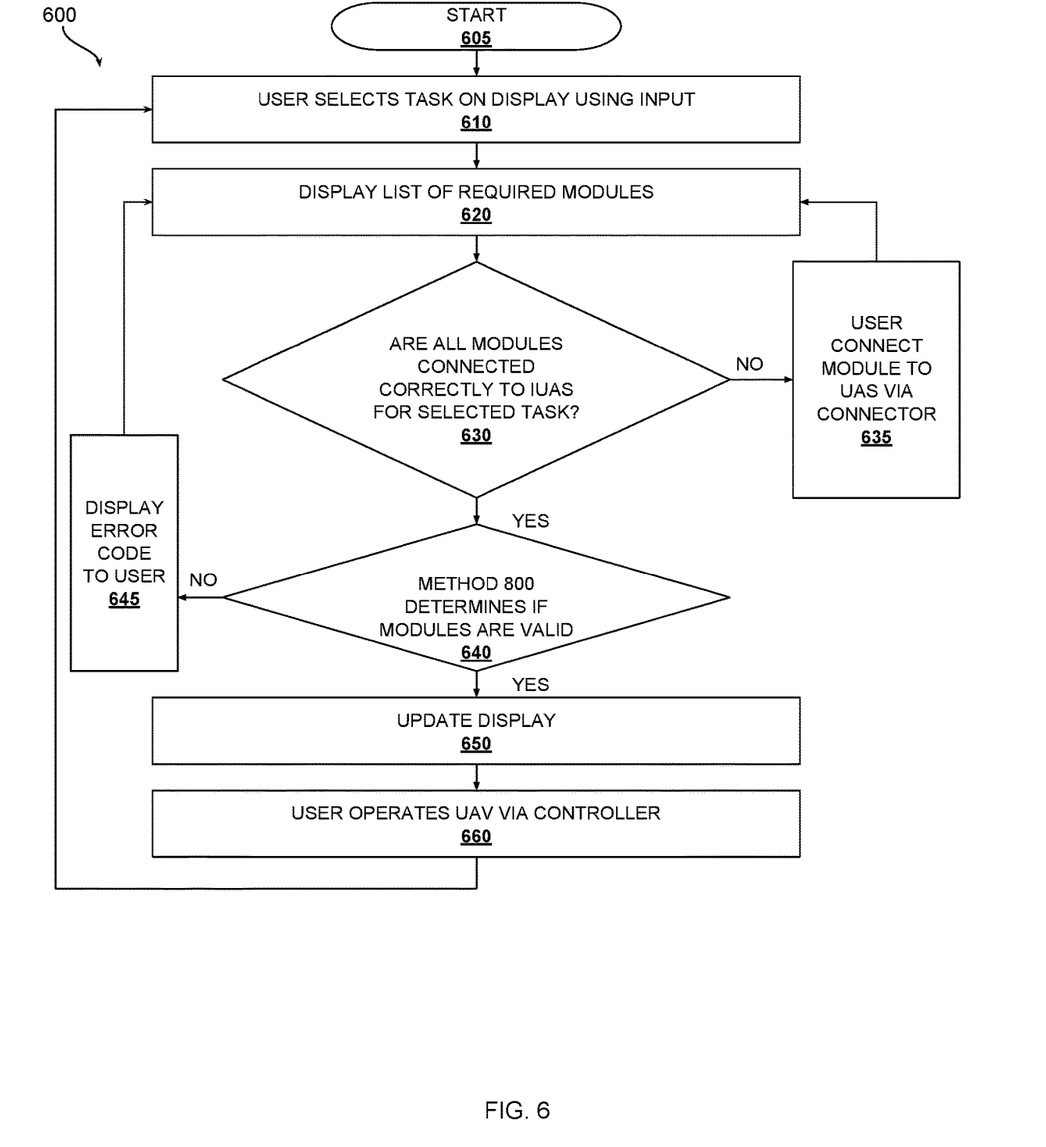
FIG. 6 is a flow diagram illustrating one embodiment of a UAS configuration and control method such as for use with the UAS system of FIG. 1.

In FIG. 4, one exemplary embodiment of a UAS 110 is shown in more detail with a functional block diagram. The scalable and customizable elements of the UAS 110 include at least one unmanned aerial vehicle (UAV) 405 and a ground controller or base station 410. The UAV 405 includes, but is not limited to, a module 140, a connector 130, a UAS readiness method 800 that includes a controller and/or processor as may be provided as part of the UAS or intelligent system 110 with software/programs to implement the intelligent or UAS control method described herein (e.g., the method 800 shown in FIG. 8). The ground controller 410 is shown to include, but is not limited to, a transmit/receive element 420, a display screen 425, a processor 430, a power source 435, a user input device 440, memory 445, a cloud connection 450, the intelligent method 600 that includes a controller and/or processor as may be provided as part of the UAS or intelligent system 110 with software/programs to implement the intelligent or UAS control method described herein (e.g., as shown in FIG. 6), and other components 455. While software is illustrated as part of UAV 405 or ground control 410, it is not limited to being executed in those locations (e.g., intelligent method 600 may be run on a UAV or the cloud, and method 800 may also be executed in a location other than on a UAV, such as on a user device or on the cloud).

FIG. 5 demonstrates one preferred embodiment of the module data 150 that may be associated with and stored in the memory (e.g., memory 230) of module 140. The module data 150 is the data that is provided to intelligent UAS system 110 when a module 140 is connected via a connector 130 to the UAS 110 (e.g., plugged into a UAV or the like as detailed in method 700 in FIG. 7). The module data 150 is shown to include, but is not restricted to, weight (of the module) 505, power consumption (by the module's elements) 510, module identifier 515, sensors (provided in the module) 520, number of connections 525, lift provided 530, power provided (by the module elements) 535, location (within the UAS such as location of connector on a UAV or the like for proper assembly of the UAV) 540, and other elements 550.

FIG. 6 details one useful method 600 for the operation (a UAS control method) of a UAS such as the IUAS system 110 shown in FIG. 1. The intelligent method 600 starts at 605 such as with loading control software onto a ground controller and/or in a UAV or other unmanned vehicle in a UAS for providing the functions/steps of method 600.

Figure 7:
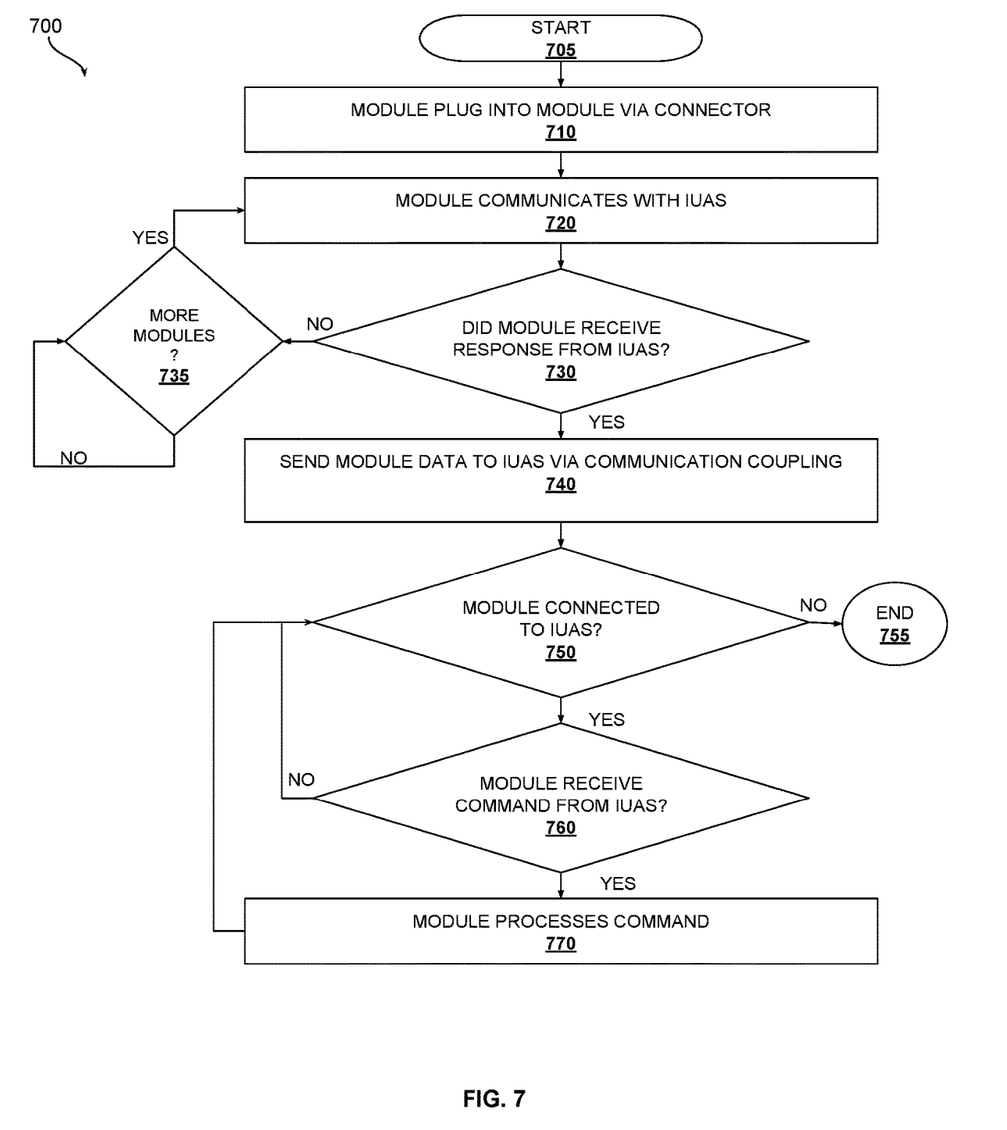
FIG. 7 is a flow diagram illustrating one embodiment of a module registration method such as the module of FIG. 2.

In step 610, a user 180 selects a desired task on display 425 using input 440, e.g., from a list of predefined tasks available with the UAS system 110 (or its unmanned vehicles). The method 600 then continues at 620 with the ground controller displaying on display 425 a list of required modules 140 to perform the task chosen in step 610. At step 630, the IUAS determines if all modules 140 required for task 140 specified by the user in step 610 have been properly registered with the IUAS via the module(s) communicating with the IUAS 110 in method 700. If not, step 635 is performed to repeat step 620 to display all the modules 140 again and/or to inform the user that all the needed modules are not yet connected to the UAS 110 (or by displaying only the missing modules 140).

Figure 8:
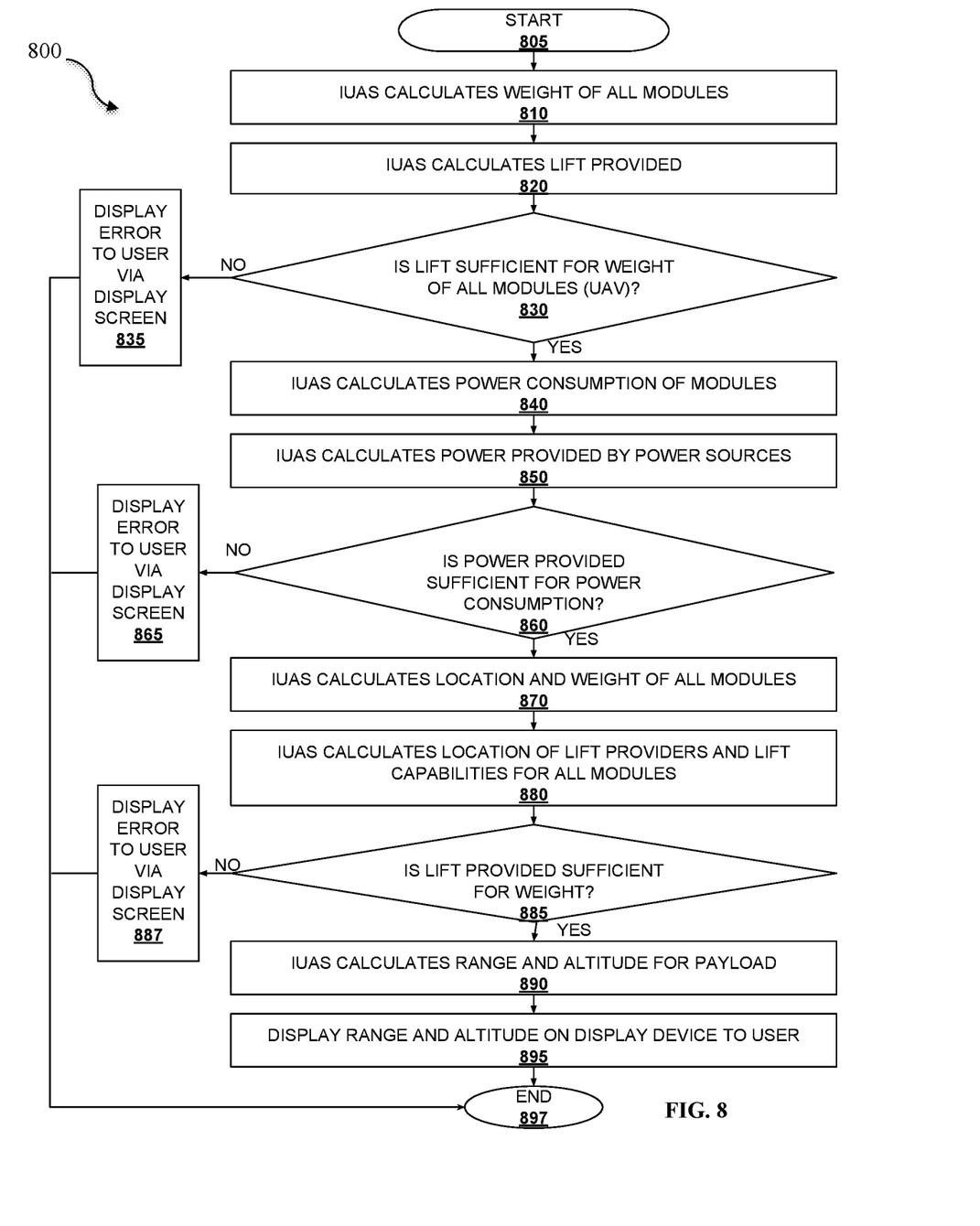
FIG. 8 is a flow diagram illustrating one embodiment of calibration of modules such as the module of FIG. 2.

The method 600 then continues after step 630 with the IUAS executing method 800 in step 640 to determine whether or not all the modules 140 are valid to provide sufficient thrusts, power, and so forth to ensure the aircraft is ready for flight. If not determined to be valid, the method 600 performs step 645 in which an error code is displayed to the user via operation of the display screen 425 and then step 620 is repeated or executed. If the modules 140 are validated and the UAS is ready for task execution, step 650 executes in the method 600 to operate the display screen 425 to indicate that all modules 140 are valid and operations of the UAV or other unmanned vehicles by the UAS 110 may proceed. At step 660, the user operates the UAV/unmanned vehicle 405 via the controller 410, and the method 600 may then continue at 610. In method 600, one task is selected for execution, but it is contemplated that multiple tasks may be selected.

FIG. 7 demonstrates one possible method 700 executed by each module 140. Particularly, the method 700 is performed to provide, for module(s) 140, registration and communication with the intelligent UAS system 110. As shown, the method 700 starts at 705 when the module 140 receives power either via an on-board power switch or when connected to another module 140 that provides power.

In step 710, the module 140 detects a connection with a new module 140. Then, at step 720, the module(s) 140 attempt to communicate with the IUAS 110 via a connector 330. In step 730, the method 700 involves determining whether the module 140 receives a response from the UAS 110 (e.g., indicating successful connection and initiating of communications, possibly wireless, between the module 140 and the controller/controller program). Step 735 executes when step 730 fails and remains in a loop waiting until a new module is connected. When a module 140 is connected, step 735 returns to step 720 and attempts to initiate communication with IUAS 110.

If the module 140 receives a response from the UAS 110 as verified in step 730, the method 700 continues with performing step 740. At 740, module data 150 is transmitted to the UAS 110 via communication connector 330 (of the connector 130) used to couple the module 140 with the UAS 110. The method continues to step 750 and determines if the module 140 remains connected to the UAS 110. If step 750 fails, the method 700 exits or ends at 755; otherwise, the method 700 continues with step 760. Step 760 determines if the module(s) 140 receives a command from the UAS 110 (or its controller and/or control software). Step 770 executes if step 760 is successful (message is received). If step 760 fails (no message received), step 750 is executed or repeated. In step 770, the module 140 processes the UAS command. Method 700 will remain in the loop executed by step 770 as long as the module 140 remains connected to the UAS 110.

FIG. 8 shows steps of one possible method 800 executed by IUAS 110 for automatic calibration of the module 140 and determination of flight readiness, with the method 800 starting at 805 by a call from the method 600. In step 810, the UAS 110 (or its controller and control software) calculates weight of all modules 140 such as with a lookup and summation of weight values 505 in module data 150.

In step 820, the UAS 110 calculates the lift provided such as by retrieving and summing the lift provided value 530 from data module 150. In step 830, the UAS 110 determines if this lift from step 820 is sufficient for the weight of UAV 405 (determined in part from calculated weight from step 810). If step 830 fails (lift is not greater than weight), step 835 is executed to operate the display screen 425 to display an error 802 to the user related to insufficient lift and the method ends in step 897.

If the calculated lift is adequate, step 830 is successful and step 840 is executed. Step 840 involves the UAS 110 calculating power consumption 510 of the modules 140. In step 850, the method 800 continues with the UAS 110 calculating the power provided 535 by power sources 240 of the module(s) 140. Step 860 involves the UAS 110 determining if the provided power 535 is sufficient for the determined power consumption 510. If step 860 fails (power is not sufficient from power sources), step 865 executes with an insufficient power provided error displayed to the user (such as via operations of the display screen 425) and the method ends in step 897.

Step 870 is executed when step 860 is successful (power provided equals or exceeds power consumption for selected task) and involves the UAS 110 determining the location 540 and weight 505 of all the modules 140 to determine airworthiness. In step 880, the UAS 110 determines the location from step 870 of thrust 260, lift provided 530, and lift capabilities from step 820 for all the modules 140. Step 885 involves determining if lift 530 and power provided 535 is greater than the calculated weight from step 870 to maintain airworthiness. Step 887 is executed if step 885 fails, and an error is displayed to the user via operation of the display screen 425 and the method 800 ends in step 897. Step 890 executes if step 885 is successful, and the UAS 110 calculates range and altitude for the payload 250. In 895, the calculated range and altitude from step 890 are displayed to a user on display device 425, and the method 800 ends at step 897. The steps of method 800 are not illustrated to be all inclusive and may be omitted or combined as necessary. The determination of airworthiness and associated calibration of the modules may be more complicated than illustrated and is contemplated to be within the scope of the invention.

Figure 9:
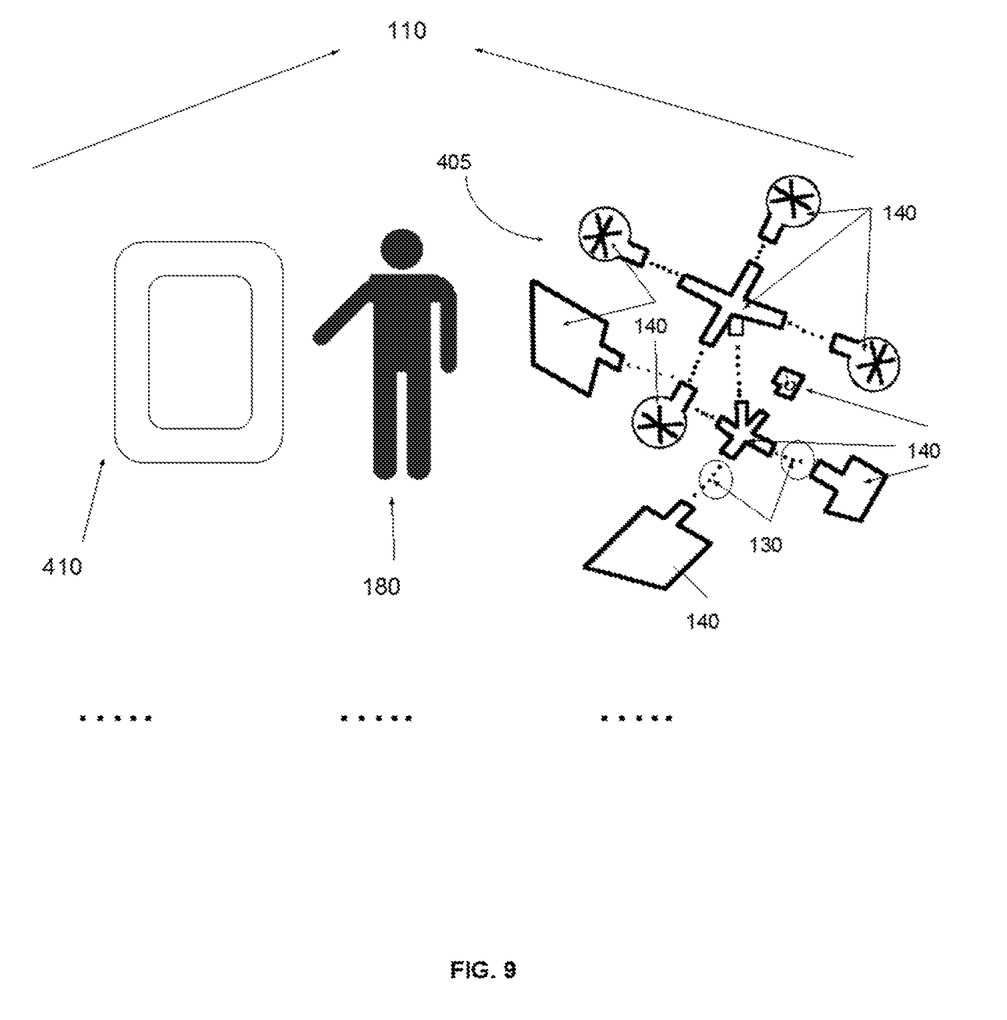
FIG. 9 illustrates one embodiment of the implementation of a UAS, such as UAS of FIG. 1, that combines customizable and scalable modules (such as those shown in FIG. 2) into a UAV (such as the UAV of FIG. 4).

FIG. 9 illustrates a view of one possible embodiment of the components of an IUAS 110 including, but not restricted to, a UAV 405, ground control 410, and user 180. As shown, the UAV 405 includes one or more modules 140 connected via connectors 130. A plurality of arrangements of the modules 140 is possible to implement a desirable and useful UAV 405. The UAV 405 is illustrated as a quadcopter but could take a range of aircraft forms including single copter, fixed wing aircraft, or any other form of rotary or fixed wing aircraft or hybrids/combinations thereof, ranging in size and complexity. While a single user, ground control, and UAV are illustrated, it is contemplated that multiple users, ground controls, UAVs and combinations or omissions thereof may be utilized in IUAS 110.

Although some embodiments are shown to include certain features, the applicant specifically contemplates that any feature disclosed herein may be used together or in combination with any other feature on any embodiment of the invention. It is also contemplated that any feature may be specifically excluded from any embodiment of an invention.

For example, many variations of the described UAS and associated methods will occur to those skilled in the art. Some variations include, but are not limited to: the use of multiple UAVs; alternate connection types between modules; integration with external storage, processors, hardware, software, and the cloud; and calibration of more elements of the UAS such as guide, stabilization, or flight control. The range of viewing and input devices in the UAS system is also not restrictive and could include both mobile internet devices and non-mobile devices as well as head-mounted viewing devices such as augmented reality (AR) or virtual reality (VR) goggles. The UAS system can also be configured to include not only aircraft (UAVs) but also autonomous motorized ground vehicles, sea craft, spacecraft, and other types of unmanned vehicles. The system can be manned with an operator or can be run autonomous. All such variations are intended to be within the scope and spirit of the description and following claims.

With the above discussion and general discussion of an intelligent UAS (IUAS) understood, it may be useful to more specifically discuss functions of particular components and control software of the intelligent system and the task-specific modules that comprise the UAS.

During the planning stage, an operator selects a task for completion on their user device, such as a smartphone. In some implementations, the user device may be a wearable device such as a smart helmet with Augmented Reality (AR). The planning stage may also be completed on a website and does not yet require the user to physically possess the UAS. The user may choose tasks that range in complication from flying-for-fun to specialized commercial, industrial, military, or scientific tasks. As an illustrative example, the operator is a member of a research team at an educational institution who wishes to acquire remote sensing data to locate ancient landscape modifications in a rainforest environment. Ancient limestone ruins in a rainforest environment alter the appearance of overlying vegetation when viewed in color infrared (a change that is otherwise not visible to the naked eye when viewed in the visible color spectrum). When the remote sensing task is selected, the IUAS provides the user a list of necessary modules for task completion which may include: a remote sensing module, a design module, a ground control module, and a basic UAV. These modules may be comprised of packaged components purchased by the archaeologist and may come pre-assembled in task-specific packages.

The IUAS software is required to coordinate all of the connected modules, to ensure precise operation of the IUAS including identifying correct installation of modules and error checking, and to determine if the UAS is ready for flight. The associated software for successful module connection, error checking, flight, and calibration may run on the base UAV, ground control, executed on the user device (e.g. the software may be downloaded, installed, or come pre-installed), or, in some embodiments, run external such as on the cloud. The base UAV may include pre-assembled components common to a multitude of tasks (e.g. thrust, power, stabilization, communication, ground control) to quickly repurpose the UAS with minimal investment. A color infrared camera and associated storage may provide the remote sensing module. A ground control module may include a user device and controller to interface with the UAV. In some embodiments, more than one UAV (or ground control) is required and assembled for the task. In other cases, more than one operator may be necessary. In yet a further embodiment, more than one task may be selected for the IUAS that uses a common configuration (or vice versa).

During assembly, each module contains module information to ensure components are assembled correctly. Modules may be physically identified by color, markings, shapes, or other distinguishing features. Modules are assembled in this illustrative example via a locking pin-mount system that provides both a physical and data connection to aid in correct UAS assembly although alternate connections provided by a manufacturer could also be utilized. As modules are connected together, module information is passed to the IUAS to determine both if they are communicating correctly and if they are assembled correctly. If the module information received by the system does not compare to that required for task(s) completion, the operator is given an error that requires correction for UAS operation. For example, if the user fails to install the color infrared camera module, the selected task cannot be completed, and an error is issued.

When assembly is correctly completed, aided by the IUAS, the system is prepared for flight. During preflight, the IUAS automatically calibrates all components to aid in successful task completion. For example, it calculates if the range of the UAV is sufficient to acquire the remote sensing data and successfully return home based on the power consumption and environmental conditions, performs stabilization, and calculates aircraft weight. Furthermore, the system ensures all systems are ready for flight and the UAV is airworthy (e.g. is the UAV successfully communicating with ground control?). During operation (e.g. task execution), the operator interfaces with the aircraft and overall UAS through a controller. The operator may control the UAV through the controller. In some implementations, a flight plan may be prepared by the IUAS for the UAV and does not require control by the user. The IUAS operates until the task is completed or the user cancels the task. The task-based drone configuration and verification reduces the possibility of task failure.

The invention claimed is:

1. A method of fabricating an unmanned aerial vehicle (UAV), comprising:
  with an input device, receiving user input selecting a task to be performed during operations of the UAV;
  with a processor, determining a set of hardware modules with hardware and software for performing the task;

displaying on a display device the set of hardware modules for attachment to the UAV, wherein each of the hardware modules includes memory storing a module identifier, a connector identification for a plurality of connectors associated with the hardware modules and adapted for physically and communicatively coupling the hardware modules and the UAV, and a connection location for each of the connectors and wherein the displaying comprises displaying the module identifier for each of the hardware modules; and based on communications with the hardware modules via the connectors, determining whether all of the hardware modules have been communicatively coupled to the UAV.

2. The method of claim 1, further including, when the determining of whether all the hardware modules have been coupled fails, displaying an error indication on the display device.

3. The method of claim 1, wherein each of the hardware modules comprises one or more components selected from the group consisting of: a camera, a sensor, a navigation element, a processor, a wireless communication element, memory, persistent memory storing module data, a power source, a UAV fuselage, a payload, a stabilization element, a thrust element, a lift element, a display device, and a flight control device.

4. The method of claim 1, wherein the memory of each of the hardware modules stores a module weight and a module-provided lift, and wherein the processor determines whether a summation of the module-provide lifts is greater than a summation of the module weights and, if not, displays an error message on the display device.

5. The method of claim 1, wherein the memory of each of the hardware modules stores a power consumption value and a power provided value, and wherein the processor determines whether a summation of the power provided values exceeds a summation of the power consumption values and, if not, displays an error message on the display device.

6. The method of claim 1, wherein the processor determines a range for the UAV based on module data for each of the hardware modules stored in memory of the hardware modules and wherein the processor operates the display device to display the determined range.

7. A method of fabricating an unmanned aerial vehicle (UAV), comprising:

receiving user input selecting a task for the UAV;
determining hardware modules for performing the task after attachment onto the UAV;
displaying each of the hardware modules including module-specific data including a module identifier, a connector identification for a plurality of connectors each associated with one of the hardware modules, and a connection location for each of the connectors on the UAV; and
based on communications with the hardware modules via the connectors, determining whether at least a subset of the hardware modules have been communicatively coupled to the UAV.

8. The method of claim 7, further including, when the determining of whether all the hardware modules have been coupled fails, displaying an error indication.

9. The method of claim 7, wherein each of the hardware modules comprises one or more components selected from the group consisting of: a camera, a sensor, a navigation element, a processor, a wireless communication element, memory, persistent memory storing module data, a power source, a UAV fuselage, a payload, a stabilization element, a thrust element, a lift element, a display device, and a flight control device.

10. The method of claim 7, wherein the memory of each of the hardware modules stores a module weight and a module-provided lift, and wherein the method further comprises determining whether a summation of the module-provide lifts is greater than a summation of the module weights and, if not, displaying an error message.

11. The method of claim 7, wherein the memory of each of the hardware modules stores a power consumption value and a power provided value, and wherein the method further comprises determining whether a summation of the power provided values exceeds a summation of the power consumption values and, if not, displaying an error message on the display device.

12. The method of claim 7, further comprising determining a range for the UAV based on module data for each of the hardware modules stored in memory of the hardware modules and wherein the method further comprises displaying the determined range.

13. A method of fabricating an unmanned aerial vehicle (UAV), comprising:

receiving user input selecting a task for the UAV;
with a processor, determining a set of hardware modules for performing the task, wherein at least a subset of the set of hardware modules comprises software and hardware associated with performance of the task;
displaying on a display device the set of hardware modules, wherein each of the hardware modules includes memory storing a module identifier, a connector identification for a plurality of connectors each associated with one of the hardware modules, and a connection location for each of the connectors on the UAV;
based on communications with the hardware modules via the connectors, determining when all of the hardware modules have been communicatively coupled to the UAV;
after the determining of when all the hardware modules have been coupled is completed
with the processor, determining a range for the UAV based on module data for each of the hardware modules stored in memory of the hardware modules; and
operating the display device to display the determined range.

14. The method of claim 13, wherein each of the hardware modules comprises one or more components selected from the group consisting of: a camera, a sensor, a navigation element, a processor, a wireless communication element, memory, persistent memory storing module data, a power source, a UAV fuselage, a payload, a stabilization element, a thrust element, a lift element, a display device, and a flight control device.

15. The method of claim 13, wherein the memory of each of the hardware modules stores a module weight and a module-provided lift, and wherein the processor determines whether a summation of the module-provide lifts is greater than a summation of the module weights and, if not, displays an error message on the display device.

16. The method of claim 13, wherein the memory of each of the hardware modules stores a power consumption value and a power provided value, and wherein the processor determines whether a summation of the power provided values exceeds a summation of the power consumption values and, if not, displays an error message on the display device.

* * * * *